US008249582B1

(12) United States Patent
Abou-El-Ella et al.

(10) Patent No.: US 8,249,582 B1
(45) Date of Patent: Aug. 21, 2012

(54) SELF-CARE CLIENT INTEGRATION WITH DIAGNOSTIC CLIENT

(75) Inventors: Hassan Abou-El-Ella, Overland Park, KS (US); Sei Y. Ng, Olathe, KS (US); Robert E. Urbanek, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 63 days.

(21) Appl. No.: 12/962,611

(22) Filed: Dec. 7, 2010

(51) Int. Cl.
*H04W 24/00* (2009.01)
(52) U.S. Cl. ............... 455/423; 455/418; 455/414.1; 455/566; 455/412; 455/517
(58) Field of Classification Search ............ 455/423, 455/414.1, 566, 517, 412, 418
See application file for complete search history.

(56) References Cited

U.S. PATENT DOCUMENTS

| 2002/0065109 | A1* | 5/2002 | Mansikkaniemi et al. | ... 455/566 |
| 2012/0071139 | A1* | 3/2012 | Kumar et al. | ............. 455/414.1 |

OTHER PUBLICATIONS

Breau, Jeremy R., et al., "Handset Diagnostics," filed Sep. 24, 2009, U.S. Appl. No. 12/565,875.

* cited by examiner

*Primary Examiner* — Kiet Doan
*Assistant Examiner* — Michael T Vu (57) ABSTRACT

A processor-implemented method is provided comprising a portable electronic device receiving a first message that a key sequence was entered into the device wherein the key sequence is associated with sending of an outgoing transmission that was not connected. The method also comprises the device performing a first test comprising confirming at least one of the mobile directory number (MDN) and the network access identifier (NAI) of the device. The method also comprises the device performing a second test comprising requesting a first server to transmit a short message service (SMS) message to the device. The method also comprises performing a third test comprising transmitting a hypertext transport protocol (HTTP) message to a second server. Based on the results of at least one of the tests, the device at least one of displays a first visual message and plays a second audible message advising at least one corrective action step.

16 Claims, 6 Drawing Sheets

SELF-CARE CLIENT INTEGRATION WITH DIAGNOSTIC CLIENT

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Portable electronic devices, for example mobile telephones, may be unable to access service for a plurality of reasons. The device may have hardware, provisioning, or connectivity issues. The device may be functioning normally but be unable to initiate or maintain connection because of problems with local coverage or with long distance carriers. Hardware problems may comprise non-repairable internal corrosion due to persistent moisture in the unit. Extreme heat in an automobile may damage the battery or the electronics. Extreme cold may cause a loss of the screen display. When keys do not work, the keypad may be locked, and the user may look for a display of a symbol that looks like a lock. Service problems may be related to the subscriber identity module (SIM) card that may be removed and placed back into the device or placed into a different device. When a user is unable to receive calls, the user may confirm that neither call forwarding nor automatic voice-mail pickup is activated. The user may confirm that the ringer is on (not in silent mode) and that ringer volume is turned up. The handoff of signal from one cell tower to another may fail due to signal dissipation and network errors. Signal handoff between long distance carriers also may disrupt service.

SUMMARY

In an embodiment, a processor-implemented method is provided. The method comprises a portable electronic device receiving a first message that a key sequence has been entered into the portable electronic device wherein the key sequence is associated with sending of an outgoing transmission and wherein the outgoing transmission was not connected. The method also comprises the portable electronic device performing a first test comprising confirming at least one of the mobile directory number (MDN) and the network access identifier (NAI) of the portable electronic device. The method also comprises the portable electronic device performing a second test comprising requesting a first server to transmit a short message service (SMS) message to the portable electronic device. The method also comprises the portable electronic device performing a third test comprising transmitting a hypertext transport protocol (HTTP) message to a second server. Based on the results of at least one of the first test, the second test, and the third test, the method also comprises the portable electronic device at least one of displaying a first visual message and playing a second audible message advising at least one corrective action step.

In an embodiment, a processor-implemented method is provided. The method comprises a portable electronic device receiving a first message, the first message advising that a key sequence has been entered into the portable electronic device wherein the key sequence is associated with sending of an outgoing transmission and wherein the outgoing transmission was not connected. The method also comprises the portable electronic device sending a second message to a server wherein the second message is transmitted using the hypertext transport protocol (HTTP) and wherein the second message contains at least one of a version of a preferred roaming list (PRL) stored in the portable electronic device and a version of firmware executing on the portable electronic device. The method also comprises the server determining that at least one of the version of the preferred roaming list stored in the portable electronic device and the version of firmware is not current. The method also comprises the server sending a third message to the portable electronic device, the third message advising that at least one of the version of the preferred roaming list stored in the portable electronic device and the version of firmware is not current. The method also comprises the portable electronic device at least one of displaying a fourth visual message and playing a fifth audible message, the fourth message and fifth message advising that at least one of the preferred roaming list stored in the portable electronic device and the version of firmware is not current. The method also comprises the portable electronic device providing at least one of a voice-activated selectable option and a visual selectable option providing the opportunity to download and install at least one of a current preferred roaming list and a current version of firmware.

In an embodiment, a portable electronic device is provided comprising a processor, a memory, a radio transceiver, and an application, that, when executed on the portable electronic device, receives a first message that a first key sequence has been entered into the portable electronic device wherein the first key sequence is associated with the portable electronic device sending a first transmission and wherein the first transmission was not connected. The application also determines that the portable electronic device is currently configured in an airplane mode, and at least one of displays a visual second message and plays an audible third message advising that the portable electronic device is currently configured in the airplane mode.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The present disclosure teaches a system and methods that enable a portable electronic device that is experiencing a problem, for example inability to place an outgoing call or inability to access other wireless services, to perform a series of self-care diagnostic steps and to resolve the problem without contacting a live customer care function of a telecommunications services provider. An application executing on the portable electronic device may detect that airplane mode is activated such that outgoing calls cannot be made. The application may notify the user of this setting and may provide the user the opportunity to deactivate airplane mode. If an attempted call or other wireless transmission fails, or the user enters a keypad sequence to contact customer care, the application may intercept the transmission and run a sequence of tests that may comprise contacting at least one service provider. The tests may determine if the portable electronic device is properly provisioned for wireless services, if voice and data channels are functioning for the portable electronic device, and if the versions of preferred roaming list (PRL) and firmware presently stored in the portable electronic device are correct and current. Based on the results of the tests, the application performs a series of actions or may provide the user of the portable electronic device the opportunity to execute actions that may resolve the problem and permit the portable electronic device to access desired wireless services.

A telecommunications services provider that provides a suite of wireless communication services to a plurality of users of portable electronic devices may operate a customer care function staffed with technical professionals. Customer care functions may be expensive to staff and operate. The telecommunications services provider may seek tools and methods to provision service and resolve problems that do not require involvement of customer care personnel. A diagnostic application taught herein executes on the portable electronic device and initiates a series of steps, some involving the contacting of service providers as well as engaging user participation, that promote the resolution of problems without accessing customer care. The combination of steps builds on one test result to the next to diagnose the most likely problems preventing service access and provides the user information and actionable remedies where possible. The present disclosure teaches the diagnostic application either automatically performing testing and resolution on the user's behalf or prompting the user with information about the problem and the actions to take toward resolution. The diagnostic application aims to engage the user and promote the user to understand the problem and execute the preferred action for the remedy. The present disclosure may allow a significant percentage of potential problem areas to be tested and eliminated before customer care may be engaged, thus saving the telecommunications services provider expense and promoting greater customer care productivity, improved return on investment in customer care, and increased customer satisfaction.

The system and methods described herein provide an efficient, synergistic selection of simple, repeatable steps that capture a significant percentage of issues encountered by typical customers. The inclusion into automated routines of checking for airplane mode setting, transmitting of short message service (SMS), or text messages, to verify the functionality of a voice channel, and sending of hypertext transport protocol (HTTP) messages to confirm a data channel and verify correctness of firmware and preferred roaming list (PRL) provide a plurality of benefits to customers. Customers' time is saved by fewer steps executed in more rapid succession. This increases the likelihood of more positive customer satisfaction results. The telecommunications service provider will also likely realize cost savings associated with fewer calls to customer care because the initial checks described herein resolve more issues without involving customer care. Calls to customer care that are made are additionally associated with cost savings because the calls are shorter and information is gathered and presented in an automated fashion before customer care personnel are engaged Turning now to FIG. 1, a system 100 of self-care client integration with diagnostic client is provided. The system 100 comprises a portable electronic device 110, radio transceiver 112, a diagnostic application 120, a telecommunications services provider 130, a provisioning server 140, a provisioning database 150, a vendor server 160, a vendor database 170, a base transceiver station (BTS) 180, and a network 190.

Figure 1:
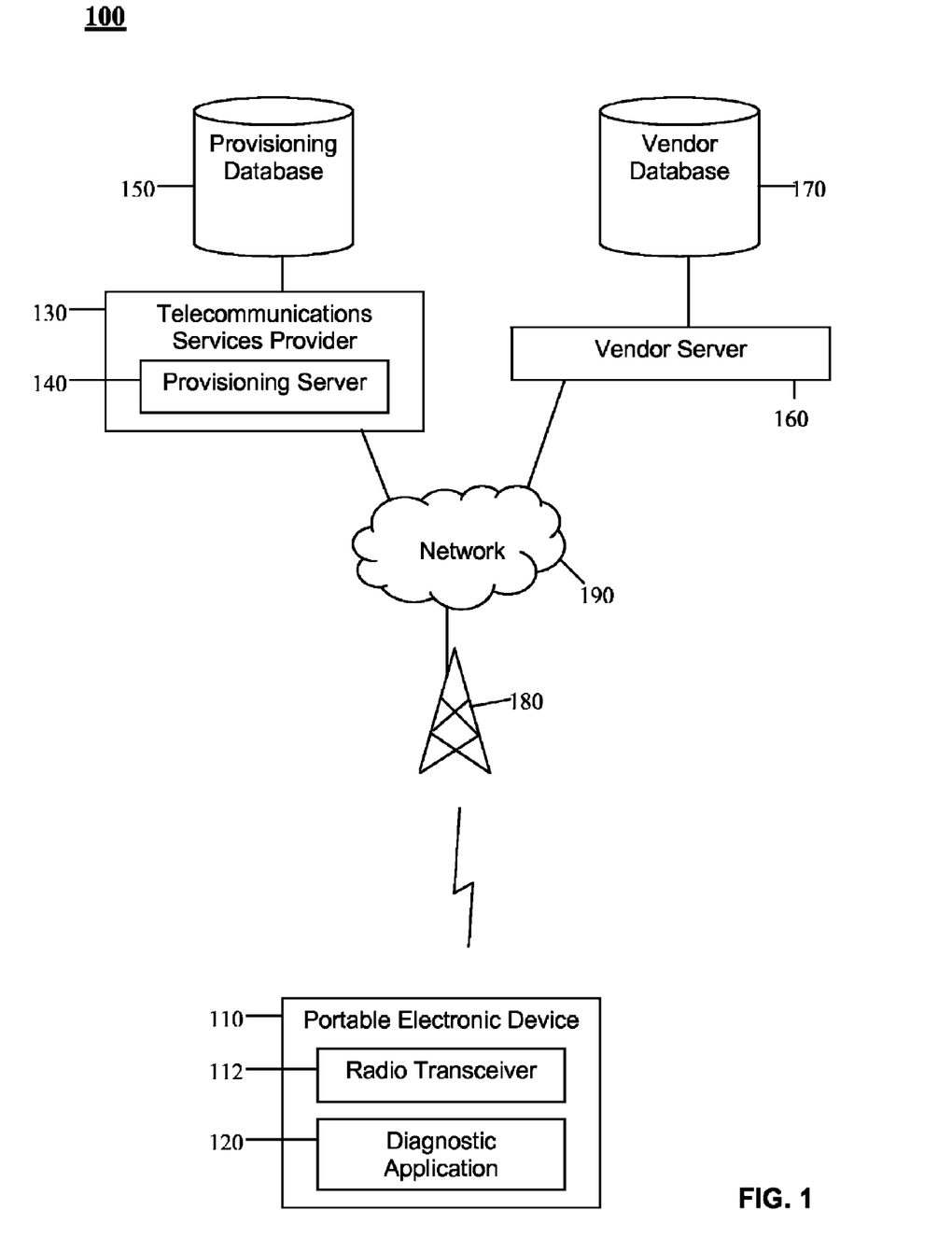
FIG. 1 is a block diagram of a system according to an embodiment of the disclosure.

The diagnostic application 120 executes on the portable electronic device 110. Portable electronic devices 110 are described in detail hereinafter. The portable electronic device 110 may receive an entry into its keypad because a user seeks to place an outgoing telephone call or initiate another outgoing wireless transmission. The triggering event to invoke the diagnostic application 120 may be an attempted outgoing telephone call wherein wireless voice services are not fully connecting or a keypad or other entry to access another wireless communication service that is not fully functioning. In an embodiment, the user may be attempting to phone a customer care function of the telecommunications services provider 130. The diagnostic application 120 may activate upon detecting a key entry that fails to access the desired service, perform a succession of tests to determine the root cause of the problem, and may implement a resolution or present the user of the portable electronic device 110 with a least one actionable option to resolve the problem. Without contacting the customer service function and consuming human resources, the diagnostic application 120 may detect that the portable electronic device 110 is presently in "airplane mode", such that the ability to complete outgoing transmissions is disabled. The diagnostic application 120 may present notification of this setting and the airplane mode may be turned off, enabling communication and resolving the problem.

The diagnostic application 120 may additionally contact the provisioning server 140 that may be associated with the telecommunications services provider 130. The provisioning server 140 may read information associated with the portable electronic device 110 to determine if the portable electronic device 110 is or ever has been provisioned for service. If not provisioned, the provisioning server 140 takes steps to complete provisioning. The diagnostic application 120 may additionally cause the provisioning server 140 to send a short message service (SMS) message, hereinafter referred to as a text message, to the portable electronic device 110. The successful receipt of the text message by the portable electronic device 110 may indicate that the channel for voice transmission is properly in place, and may eliminate that potential problem area. The diagnostic application 120 may generate and send a message using the hypertext transport protocol (HTTP) to the provisioning server 140 or other component to confirm that a channel for data transmission is properly in place. The hypertext transport protocol message also may be used to confirm that the preferred roaming list (PRL) currently stored in the portable electronic device 110 and the version of firmware presently executing on the portable electronic device 110 are correct and are at their most current versions. The hypertext transport protocol message may contain the current versions of the preferred roaming list (PRL) and may request the provisioning server 140 or other component to verify these versions as current. If the software components are not correct or current, the diagnostic application 120 may cause the correct versions to be downloaded and installed or present the user the opportunity to download and install this software.

The telecommunications services provider 130 may distribute a broad product line of portable electronic devices 110 and may provide a plurality of applications and wireless services for use with the portable electronic devices 110 under various subscription arrangements. The telecommunications services provider 130 may find that staffing and running a customer care function to assist with various customer problems and questions may be burdensome in terms of costs and demands on management attention. The telecommunications services provider 130, in seeking to manage such costs and demands, may cause the diagnostic application 120 to be installed on a plurality of portable electronic devices 110. The telecommunications services provider 130 also may configure its own internal systems, for example the provisioning server 140, to allow the diagnostic application 120 to perform the testing and invoke the resolution steps described herein to deliver services under customers' subscription agreements. These actions may promote the diagnosis and resolution of a plurality of problems experienced by users of portable electronic devices 110 without the users' needing to contact a customer care function of the telecommunications services provider 130 and engage the services of care personnel. Problems that may previously have resulted in human intervention by customer care, potentially resulting in significant care cost, may be diagnosed and resolved by the diagnostic application 120 without such costly human intervention.

The diagnostic application 120 may invoke a succession of diagnostic and resolution steps, some involving contacting the provisioning server 140 that may be associated with the telecommunications services provider 130. Other actions by the diagnostic application 120 may entail contacting components associated with other providers of services or software, for example a vendor server 160 that may provide firmware or other software updates. The diagnostic application 120 also may engage the user of the portable electronic device 110 in the diagnosis and resolution process, may inform the user of the steps being invoked, and may involve the user in effecting problem resolution, including requesting the user to make keypad, voice, and/or graphical user interface (GUI) selections into the portable electronic device 110. By involving the user in diagnosis and resolution, the components provided herein keep the user informed and provide actionable remedies that may dissuade the user from engaging customer care personnel in live contact. By remaining informed and involved, the user also may realize greater customer satisfaction. The telecommunications services provider 130 may discover that the diagnostic application 120 assists in resolution of a significant percentage of problems that otherwise may have called for involvement of customer care personnel. By following a series of diagnostic steps, each step building on the preceding steps, the present disclosure also may teach the circumvention of problems related to human error associated with live customer care involvement. For example, an inexperienced, misinformed, or inadequately trained care representative may not detect a problem until the latter stages of a call when a disciplined automated process, such as that taught herein, may detect and resolve a problem in a short time.

When a user of the portable electronic device 110 attempts to make an outgoing call or initiate another wireless transmission that is not connected, the user may attempt to phone a customer care unit of the telecommunications services provider 130 by dialing a telephone number or by entering a keypad shortcut, for example by entering the key sequence *2. These actions may occur under a plurality of circumstances. The portable electronic device 110 may previously have been functioning normally in the user's lawful possession and may have experienced a hardware or software failure. The portable electronic device 110 may be newly received by the user and may not yet be provisioned with the telecommunications services provider 130. The portable electronic device 110 may have been previously provisioned for service under a subscription account that has been suspended or closed by the telecommunications services provider 130 for any of a plurality of reasons. The user may have purchased the portable electronic device 110 or received it as a gift on a second hand basis. The portable electronic device 110 may be lost or stolen and be in the possession of a party other than its lawful owner.

The diagnostic application 120 may detect that a failed outgoing transmission of some kind occurred, including the invocation of a keypad shortcut such as *2 to contact customer care that was not connected. By detecting the failed outgoing transmission attempt, including the entry of a keypad shortcut such as *2, the diagnostic application 120 effectively intercepts the attempted transmission. For further details about the effective interception of attempted outgoing wireless transmissions and the local performance of some diagnostics on the portable electronic device 110, see U.S. patent application Ser. No. 12/565,875, filed Sep. 24, 2009, entitled "Handset Diagnostics" by Jeremy R. Breau, et al., which is herein incorporated by reference.

The diagnostic application 120 may initially determine whether airplane mode is presently activated on the portable electronic device 110 such that the signal transmitting functions of the portable electronic device 110 have been deactivated. Whether airplane mode is activated by disabling the radio transceiver 112, by blocking access to the radio transceiver 112, or by another method, the user will be unable to place outgoing calls or send any other transmissions while airplane mode is activated. If the diagnostic application 120, through its interaction with the hardware, operating system, and other software executing on the portable electronic device 110, detects that airplane mode is presently activated, the diagnostic application 120 may notify the user both visually and audibly. The diagnostic application 120 may display a message on the portable electronic device 110 that airplane mode is presently activated and may provide a selectable icon or object in the viewing area of the portable electronic device 110. The user may click on or otherwise execute the selectable icon or object to disable airplane mode and begin sending and receiving wireless transmissions. The diagnostic application 120 also may play an audible message providing the same notification that the user may hear. The user may be prompted to provide an audible voice command or keypad entry to disable airplane mode. The user may additionally or alternatively be audibly prompted to view the display area of the portable electronic device 110 and make a selection there to disable airplane mode.

After determining that activation of airplane mode is not the reason that the portable electronic device 110 is unable to successfully send a wireless transmission, the diagnostic application 120 may then initiate steps to determine that the portable electronic device 110 is provisioned for service with the telecommunications services provider 130. The diagnostic application 120 may confirm at least one of the mobile directory number (MDN) and the network access identifier (NAI) of the portable electronic device 110 in the records of the telecommunications services provider 130. The diagnostic application 120 may access the electronic serial number (ESN), mobile equipment identifier (MEID), or international mobile equipment identity (IMEI) associated with the portable electronic device 110. The diagnostic application 120 also may determine if the portable electronic device 110 still contains its default settings. The diagnostic application 120 then may send this information to the provisioning server 140 of the telecommunications services provider 130. The provisioning server 140 may access the provisioning database 150 that may store a plurality of records that associate mobile directory numbers (MDN) and network access identifiers (NAI) with electronic serial numbers (ESN), mobile equipment identifiers (MEID), and international mobile equipment identifiers (IMEI). The diagnostic application 120 may cause the provisioning server 140 to perform various procedures to determine whether the portable electronic device 110 has been provisioned for wireless services.

If the provisioning server 140 determines after performing its procedures that provisioning has not been completed for the portable electronic device 110, the provisioning server 140 and the diagnostic application 120 may exchange messages to determine the steps needed to accomplish provisioning and initiate service. If the portable electronic device 110 is new and the user purchased it from the telecommunications services provider 130 or an authorized distributor, provisioning may be a standardized and straightforward process. If the electronic serial number (ESN), mobile equipment identifier (MEID), or international mobile equipment identifier (IMEI) for the portable electronic device 110 does not correspond correctly with a mobile directory number (MDN) and/or network access identifiers (NAI) in the provisioning database 150 or other information source accessed by the provisioning server 140 and the diagnostic application 120, further investigation and action may take place to discover the source of the problem.

If the portable electronic device 110 was purchased on a second hand basis, the portable electronic device 110 may have to be reprovisioned by the telecommunications services provider 130. If the portable electronic device 110 was previously provisioned by the telecommunications services provider 130 and a subscription account was created and activated and then closed for some reason, either by the telecommunications services provider 130 or by the account holder, the provisioning server 140 may investigate and provide feedback to the user through the diagnostic application 120. The user may have to clear a balance owed the telecommunications services provider 130 to get service restored. The provisioning server 140 may access other back office systems of the telecommunications services provider 130 or other entities to access further information if the portable electronic device 110 has previously been reported as lost or stolen.

Once the diagnostic application 120 determines the portable electronic device 110 has been provisioned, the user still may experience difficulty fully accessing at least one wireless service under the user's subscription account. In an embodiment, the portable electronic device 110 may be capable of contacting the telecommunications services provider 130 to verify that the portable electronic device 110 is provisioned. However, even though the portable electronic device 110 may be provisioned, one or more wireless services may not be fully functional. When voice and/or text communication services are not fully functional, the diagnostic application 120 may cause the provisioning server 140 or other component associated with the telecommunications services provider 130 to send a text message to the portable electronic device 110. If it is determined that the text message is properly received by the portable electronic device 110, this may confirm that a voice channel is in place for the portable electronic device 110. Text messaging and voice messaging may share the same wireless channel. If the voice channel is determined to be in place, further action may be necessary to determine the reason(s) why voice and/or text communication services may be not be fully functioning. In an embodiment, the text message sent to the portable electronic device 110 is not detectable by the user of the portable electronic device 110.

The actions of the diagnostic application 120 also may comprise causing the portable electronic device 110 to send a message using the hypertext transport protocol (HTTP) to the provisioning server 140 to determine that a data channel is accessible by the portable electronic device 110. In an embodiment, the message may be sent to another component of the telecommunications services provider 130 or to a component not associated with the telecommunications services provider 130. The diagnostic application 120 may cause the message to include information about the version of the preferred roaming list (PRL) and the version of the firmware currently stored on the portable electronic device 110. When the provisioning server 140 or other component receives the hypertext transport protocol (HTTP) message, it may extract the preferred roaming list (PRL) and firmware information and may access the provisioning database 150 to determine if the preferred roaming list (PRL) and firmware are correct and current for the portable electronic device 110. In an embodiment, the provisioning server 140 or diagnostic application 120 may contact a component not associated with the telecommunications services provider 130, for example the vendor server 160, to determine whether the preferred roaming list (PRL) and the firmware are correct and current. If the portable electronic device 110 is running incorrect or noncurrent versions of the preferred roaming list (PRL) and/or firmware, these may be the causes of the inability of the portable electronic device 110 to send outgoing wireless transmissions.

If at least one of the preferred roaming list (PRL) and firmware presently running on the portable electronic device 110 is determined to be incorrect or not at its most current level, the diagnostic application 120 may provide the user of the portable electronic device 110 with notice of this and may provide the opportunity to download and install the correct and current versions. As with the messaging about airplane mode, the diagnostic application 120 may provide both an audible message and visual message to the user. The audible message may advise the user of the problem and may prompt the user to audibly respond whether the updated preferred roaming list (PRL) and/or firmware should be downloaded and installed. The audible message may additionally or alternatively advise the customer to view the display area of the portable electronic device 110 for information about the problem and how to download and install the current versions of preferred roaming list (PRL) and firmware.

In an embodiment, when the diagnostic application 120 provides an audible message to the user, the diagnostic application 120 may not provide the user the opportunity to make selections using voice response and may instead immediately direct the user to view the display to view information and make choices, when applicable. The telecommunications services provider 130 may determine that audibly presenting information and choices to the user for selection raises the risk of the user not absorbing the audible information and making incorrect selections, potentially causing user frustration and dissatisfaction.

When at least one of the preferred roaming list (PRL) and firmware presently running on the portable electronic device 110 is discovered to be incorrect or not at its most current level, and the diagnostic application 120 receives the user's election to download and install the necessary software, the diagnostic application 120 then begins accessing and installing it on the portable electronic device 110. The preferred roaming list (PRL) and the firmware may be available from the telecommunications services provider 130 and stored in the provisioning database 150. The diagnostic application 120 may send instructions to the provisioning server 140 for the provisioning server 140 to access the current preferred roaming list (PRL) and/or firmware from the provisioning database 150 and send it wirelessly to the portable electronic device 110. The preferred roaming list (PRL) and/or firmware may include installation scripts or routines such that when the software is received by the portable electronic device 110, it is automatically installed without the need for user intervention.

In an embodiment, the preferred roaming list (PRL) and/or firmware to be transmitted to and installed on the portable electronic device 110 may be accessible from an entity other than the telecommunications services provider 130. The portable electronic device 110 for example, may be executing a software platform, including firmware, originated by a third party. The third party may be an independent developer or other aggregator of portable electronic device applications that may include custom firmware adapted for the applications. The portable electronic device 110 may have been manufactured by an original equipment manufacturer (OEM) independent from the telecommunications services provider 130 and the original equipment manufacturer (OEM) may periodically make firmware updates available. The vendor server 160 may be associated with the independent developer or other aggregator of applications, with the original equipment manufacturer (OEM), or with another entity independent of the telecommunications services provider 130 that may provide the preferred roaming list (PRL) and/or firmware to be installed on the portable electronic device 110. The preferred roaming list (PRL) and/or firmware may be stored in the vendor database 170 associated with the vendor server 160.

The diagnostic application 120 may perform additional steps comprising making a determination if the short message service (SMS) lightweight directory access protocol (LDAP) server associated with the portable electronic device 110 received a provisioning record for the portable electronic device 110. The diagnostic application 120 also may determine if the requisite authentication, authorization and accounting (AAA) procedures have taken place such that data transmission is enabled for the portable electronic device 110. The diagnostic application 120 also may determine if the home location register (HLR) is provisioned for voice services to be accessed by the portable electronic device 110.

In an embodiment, the steps provided herein of determining if airplane mode is activated, determining whether the portable electronic device 110 is provisioned for service, causing a text message to be sent to the portable electronic device 110, and causing the portable electronic device 110 to generate a transmission using the hypertext transport protocol (HTTP) that may additionally comprise updating the preferred roaming list (PRL) and firmware, may not be performed in the order described. In an embodiment, the steps may be performed in a different order, some of the steps or portions of the steps may not be performed, or additional steps may be performed. When the portable electronic device 110 is experiencing some types of hardware problems, not all of the functionality of the diagnostic application 120 and provisioning server 140 taught herein may be available for resolving the problem. The diagnostic application 120 may observe hardware conditions exhibited by the portable electronic device 110 and interact with operating system software or other software that may be installed on the portable electronic device 110. Based on these observations and interactions, the diagnostic application 120 may make adjustments to the tests it runs, the procedures it carries out, the order of these actions, and the manner of its interactions with the user.

When the portable electronic device 110 is able to contact the telecommunications services provider 130, it may contact the customer care function there and determine the present hold time, if any, for speaking with a care representative. Although the present disclosure teaches a system and methods that seek to resolve transmission and other problems for the user of the portable electronic device 110 and avoid the user having to speak with a customer care representative, the diagnostic application 120, when it is able, provides the user functionality to dial customer care and speak to a representative. The diagnostic application 120 may provide the current hold time for the user and also may advise for the customer's benefit the response time for communicating with customer care using electronic mail, text messaging, and instant messaging. The diagnostic application 120 may also, if able, provide the user an opportunity to leave a voice mail message for customer care and provide an estimated response time for the voice mail message.

The portable electronic device 110 may be a mobile telephone, a media player, or a personal digital assistant (PDA). The portable electronic device 110 also may be a laptop computer equipped with hardware and/or software enabling wireless communications services. While FIG. 1 depicts only one portable electronic device 110, it is understood that a plurality of portable electronic devices 110 may be existent and in operation.

The base transceiver station 180 may be any of a cellular wireless base transceiver station, for example a Code Division Multiple Access (CDMA), Global System for Mobile Communications (GSM), Universal Mobile Communications System (UMTS), and/or Long-term Evolution (LTE) cellular wireless base transceiver station; a World-wide Interoperable Microwave Access (WiMAX) base transceiver station; a WiFi access point; a femtocell; or other wireless access devices. While FIG. 1 depicts only one base transceiver station 180, in an embodiment a plurality of base transceiver stations 180 may be existent and in operation.

The network 190 promotes communication between the components of the system 100. The network 190 may be any communication network including a public data network (PDN), a public switched telephone network (PSTN), a private network, and/or a combination thereof.

Figure 2:
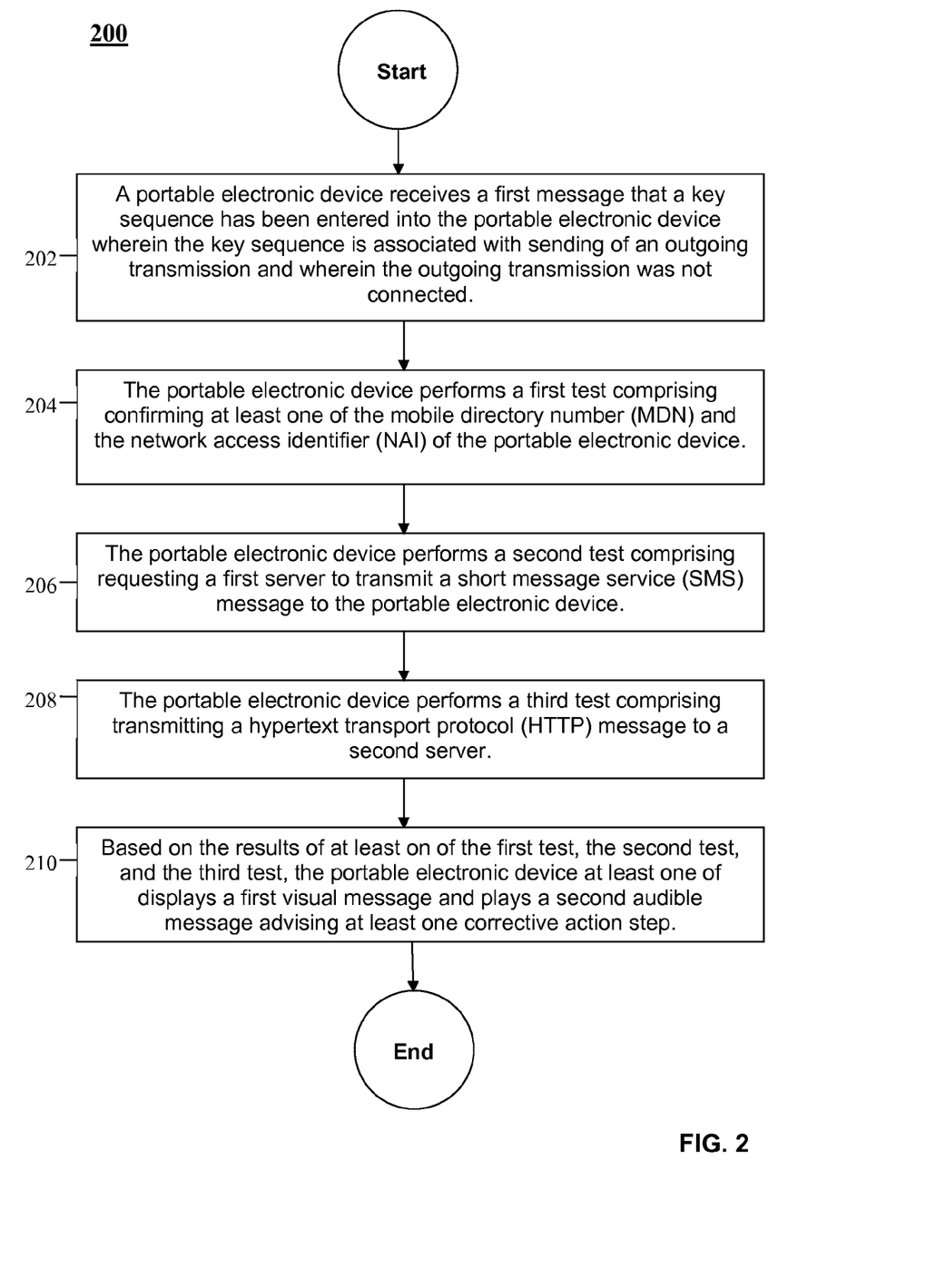
FIG. 2 is a flow chart illustrating a method according to an embodiment of the disclosure.

Turning now to FIG. 2, a processor-implemented method 200 is provided. Beginning at block 202, a portable electronic device receives a first message that a key sequence has been entered into the portable electronic device wherein the key sequence is associated with sending of an outgoing transmission and wherein the outgoing transmission was not connected. At block 204, the portable electronic device performs a first test comprising confirming at least one of the mobile directory number (MDN) and the network access identifier (NAI) of the portable electronic device.

At block 206, the portable electronic device performs a second test comprising requesting a first server to transmit a short message service (SMS) message to the portable electronic device. At block 208, the portable electronic device performs a third test comprising transmitting a hypertext transport protocol (HTTP) message to a second server. Based on the results of at least one of the first test, the second test, and the third test, at block 210 the portable electronic device at least one of displays a first visual message and plays a second audible message advising at least one corrective action step.

Figure 3:
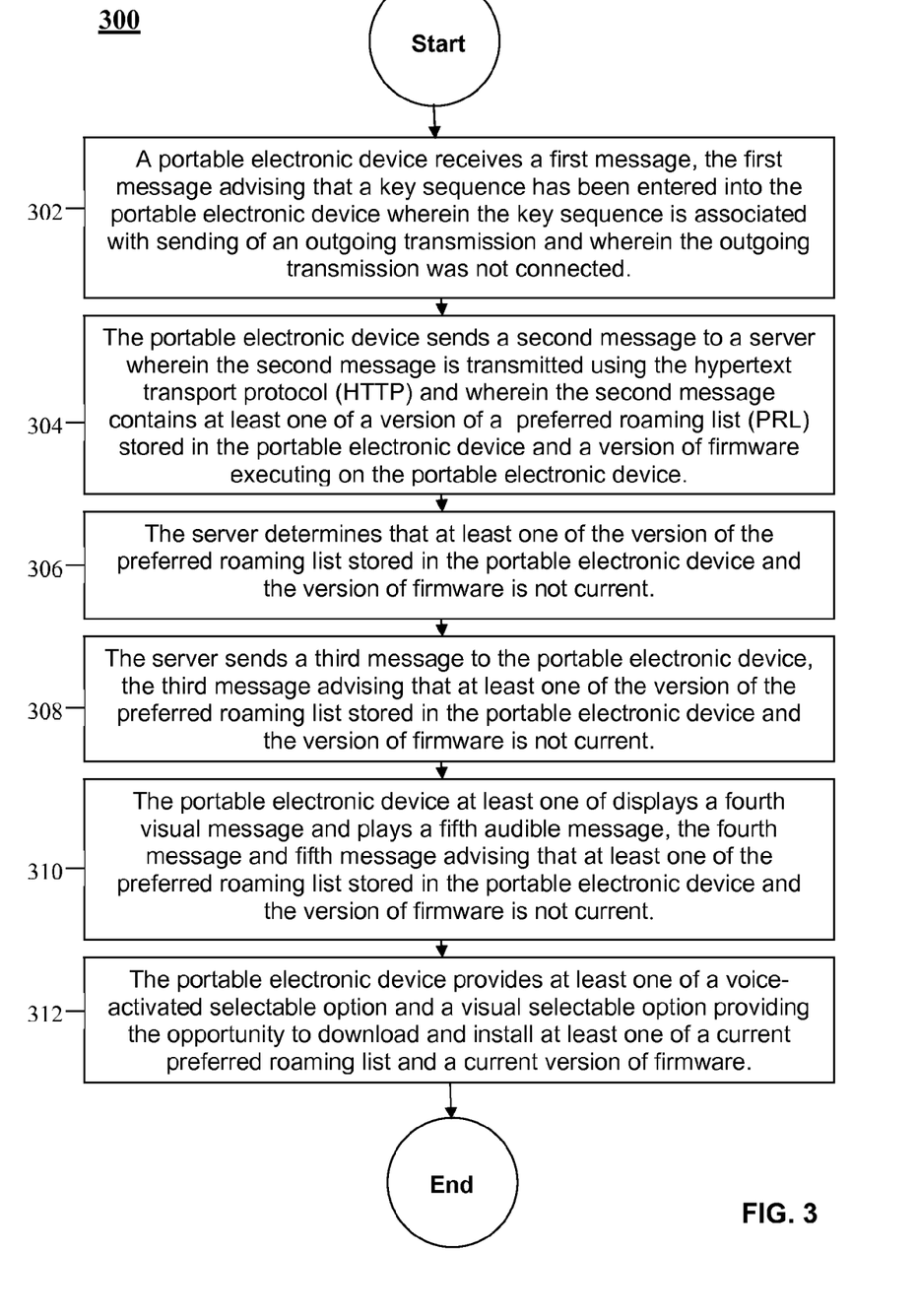
FIG. 3 is a flow chart illustrating a method according to an embodiment of the disclosure.

Turning now to FIG. 3, a processor-implemented method 300 is provided. Beginning at block 302, a portable electronic device receives a first message, the first message advising that a key sequence has been entered into the portable electronic device wherein the key sequence is associated with sending of an outgoing transmission and wherein the outgoing transmission was not connected. At block 304, the portable electronic device sends a second message to a server wherein the second message is transmitted using the hypertext transport protocol (HTTP) and wherein the second message contains at least one of a version of a preferred roaming list (PRL) stored in the portable electronic device and a version of firmware executing on the portable electronic device.

At block 306, the server determines that at least one of the version of the preferred roaming list stored in the portable electronic device and the version of firmware is not current. At block 308, the server sends a third message to the portable electronic device, the third message advising that at least one of the version of the preferred roaming list stored in the portable electronic device and the version of firmware is not current.

At block 310, the portable electronic device at least one of displays a fourth visual message and plays a fifth audible message, the fourth message and fifth message advising that at least one of the preferred roaming list stored in the portable electronic device and the version of firmware is not current. At block 312, the portable electronic device provides at least one of a voice-activated selectable option and a visual selectable option providing the opportunity to download and install at least one of a current preferred roaming list and a current version of firmware.

Figure 4:
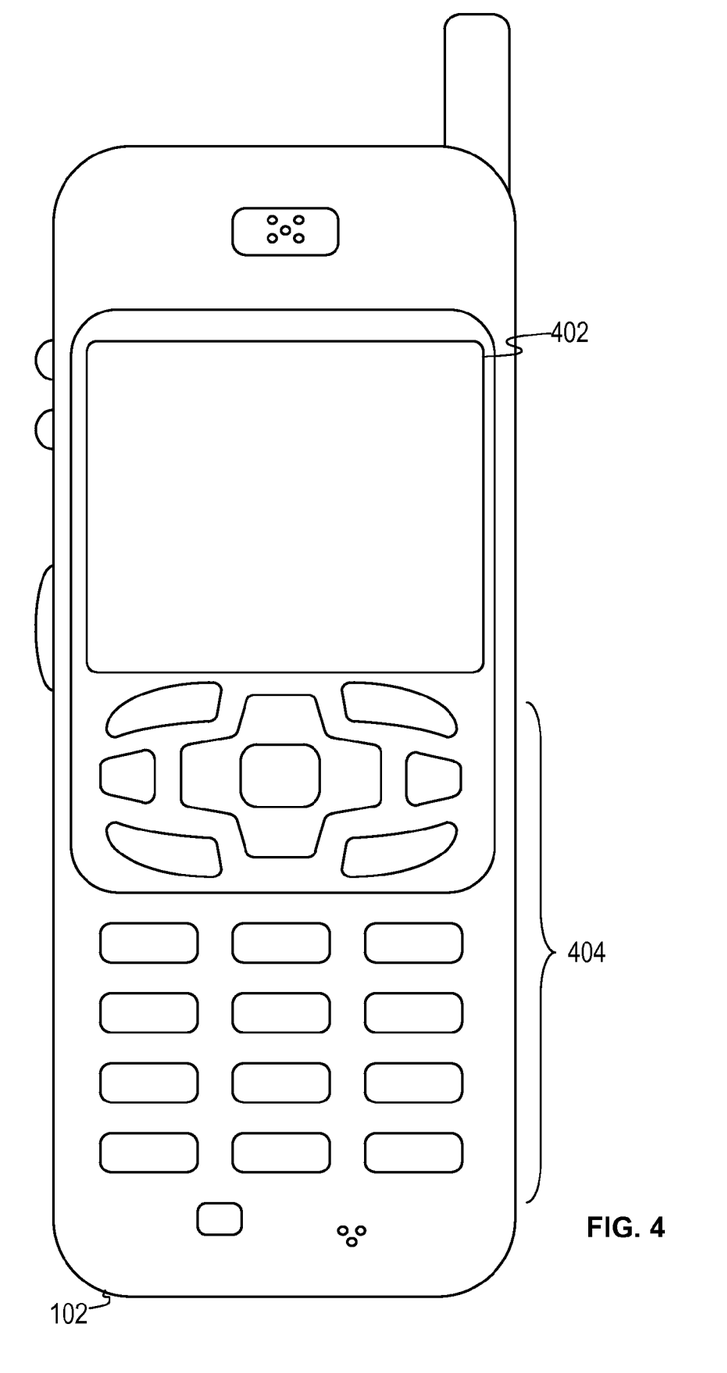
FIG. 4 is an illustration of a mobile device according to an embodiment of the disclosure.

FIG. 4 shows a wireless communications system including the mobile device 102. FIG. 4 depicts the mobile device 102, which is operable for implementing aspects of the present disclosure, but the present disclosure should not be limited to these implementations. The mobile device 102 may in some embodiments exemplify the portable electronic device 110 described in the system 100. Though illustrated as a mobile phone, the mobile device 102 may take various forms including a wireless handset, a pager, a personal digital assistant (PDA), a gaming device, an inventory control device, a media player, a digital camera, a digital calculator, a portable computer, a tablet computer, a laptop computer, and/or other. Many suitable handsets combine some or all of these functions. In some embodiments of the present disclosure, the mobile device 102 is not a general purpose computing device like a portable, laptop or tablet computer, but rather is a special-purpose communications device such as a mobile phone, wireless handset, pager, or PDA. The mobile device 102 may support specialized activities such as gaming, inventory control, job control, and/or task management functions, and so on.

The mobile device 102 includes a display 402 and a touch-sensitive surface and/or keys 404 for input by a user. The mobile device 102 may present options for the user to select, controls for the user to actuate, and/or cursors or other indicators for the user to direct. The mobile device 102 may further accept data entry from the user, including numbers to dial or various parameter values for configuring the operation of the handset. The mobile device 102 may further execute one or more software or firmware applications in response to user commands. These applications may configure the mobile device 102 to perform various customized functions in response to user interaction. Additionally, the mobile device 102 may be programmed and/or configured over-the-air, for example from a wireless base station, a wireless access point, or a peer mobile device 102.

The mobile device 102 may execute a web browser application which enables the display 402 to show a web page. The web page may be obtained via wireless communications with a base transceiver station (BTS) 180, a wireless network access node, a peer mobile device 102 or any other wireless communication network or system. While a single base transceiver station 180 is illustrated, it is understood that the wireless communication system may comprise additional base transceiver stations. In some instances, the mobile device 102 may be in communication with multiple base transceiver stations 180 at the same time. The base transceiver station 180 (or wireless network access node) is coupled to a wired network 190, such as the Internet. Via the wireless link and the wired network, the mobile device 102 has access to information on various servers. The servers may provide content that may be shown on the display 402. Alternately, the mobile device 102 may access the base transceiver station 180 through a peer mobile device 102 acting as an intermediary, in a relay type or hop type of connection.

Figure 5:
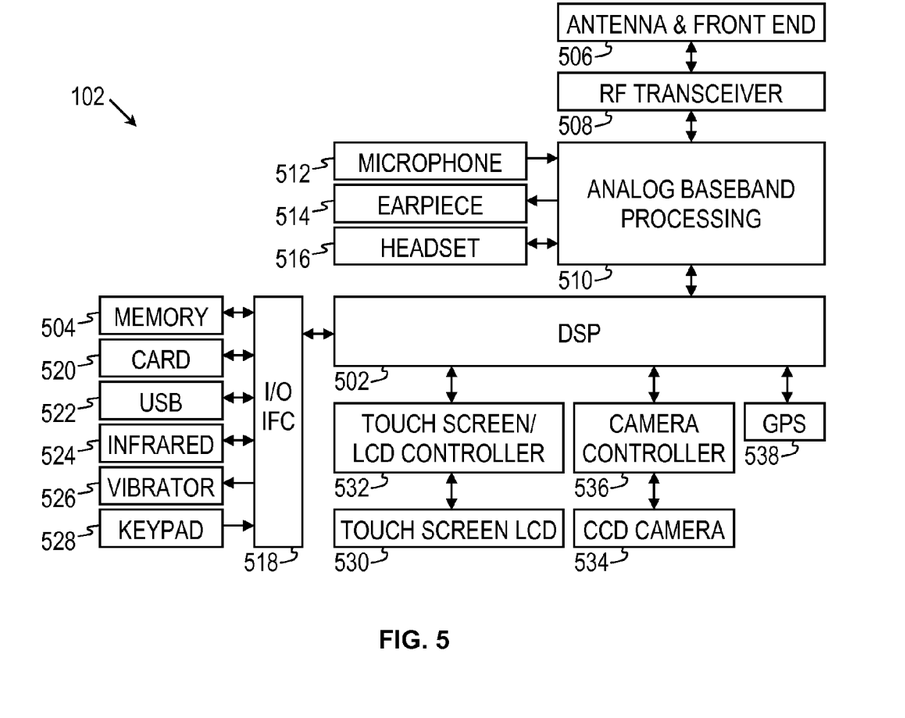
FIG. 5 is a block diagram of a mobile device according to an embodiment of the disclosure.

FIG. 5 shows a block diagram of the mobile device 102. While a variety of known components of handsets 102 are depicted, in an embodiment a subset of the listed components and/or additional components not listed may be included in the mobile device 102. The mobile device 102 includes a digital signal processor (DSP) 502 and a memory 504. As shown, the mobile device 102 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a charge-coupled device (CCD) camera 534, a camera controller 536, and a global positioning system (GPS) sensor 538. In an embodiment, the mobile device 102 may include another kind of display that does not provide a touch sensitive screen. In an embodiment, the DSP 502 may communicate directly with the memory 504 without passing through the input/output interface 518.

The DSP 502 or some other form of controller or central processing unit operates to control the various components of the mobile device 102 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the mobile device 102 to send and receive information from a radio access network (RAN) or some other available wireless communications network or from a peer mobile device 102. In an embodiment, the antenna and front end unit 506 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 506 may include antenna tuning and/or impedance matching components, RF power amplifiers, and/or low noise amplifiers.

The RF transceiver 508 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 510 and/or the DSP 502 or other central processing unit. In some embodiments, the RF transceiver 508, portions of the antenna and front end 506, and the analog baseband processing unit 510 may be combined in one or more processing units and/or application specific integrated circuits (ASICs).

The analog baseband processing unit 510 may provide various analog processing of inputs and outputs, for example analog processing of inputs from the microphone 512 and the headset port 516 and outputs to the earpiece speaker 514 and the headset port 516. To that end, the analog baseband processing unit 510 may have ports for connecting to the built-in microphone 512 and the earpiece speaker 514 that enable the mobile device 102 to be used as a mobile phone. The analog baseband processing unit 510 may further include a port for connecting to a headset or other hands-free microphone and speaker configuration. The analog baseband processing unit 510 may provide digital-to-analog conversion in one signal direction and analog-to-digital conversion in the opposing signal direction. In some embodiments, at least some of the functionality of the analog baseband processing unit 510 may be provided by digital processing components, for example by the DSP 502 or by other central processing units.

The DSP 502 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 502 may perform modulation, coding, interleaving, and spreading, and for a receiver function the DSP 502 may perform despreading, deinterleaving, decoding, and demodulation. In another embodiment, for example in an orthogonal frequency division multiplex access (OFDMA) technology application, for the transmitter function the DSP 502 may perform modulation, coding, interleaving, inverse fast Fourier transforming, and cyclic prefix appending, and for a receiver function the DSP 502 may perform cyclic prefix removal, fast Fourier transforming, deinterleaving, decoding, and demodulation. In other wireless technology applications, yet other signal processing functions and combinations of signal processing functions may be performed by the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 102 to function as a peripheral device to exchange information with a personal computer or other computer system. The infrared port 524 and other optional ports such as a Bluetooth interface or an IEEE 802.11 compliant wireless interface may enable the mobile device 102 to communicate wirelessly with other nearby handsets and/or wireless base stations.

The input/output interface 518 may further connect the DSP 502 to the vibrator 526 that, when triggered, causes the mobile device 102 to vibrate. The vibrator 526 may serve as a mechanism for silently alerting the user to any of various events such as an incoming call, a new text message, and an appointment reminder.

The keypad 528 couples to the DSP 502 via the interface 518 to provide one mechanism for the user to make selections, enter information, and otherwise provide input to the mobile device 102. Another input mechanism may be the touch screen LCD 530, which also may display text and/or graphics to the user. The touch screen LCD controller 532 couples the DSP 502 to the touch screen LCD 530.

The CCD camera 534 enables the mobile device 102 to take digital pictures. The DSP 502 communicates with the CCD camera 534 via the camera controller 536. The GPS sensor 538 is coupled to the DSP 502 to decode global positioning system signals, thereby enabling the mobile device 102 to determine its position. In another embodiment, a camera operating according to a technology other than charge coupled device cameras may be employed. Various other peripherals also may be included to provide additional functions, e.g., radio and television reception.

Figure 6:
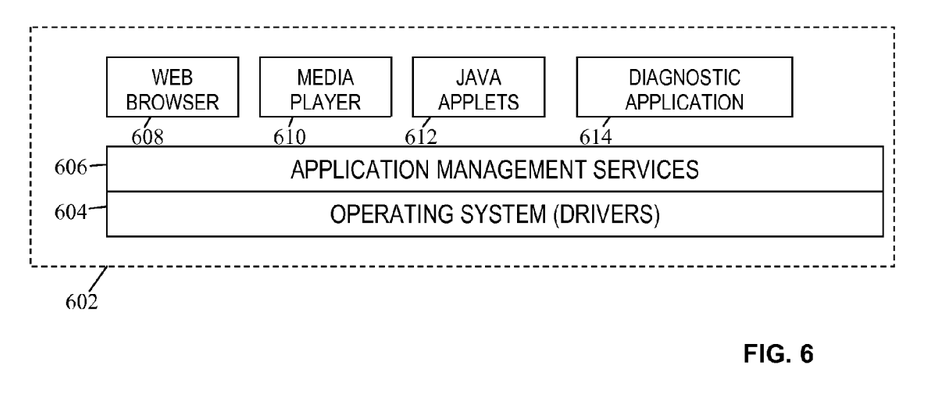
FIG. 6 is a block diagram of a software architecture for a mobile device according to an embodiment of the disclosure.

FIG. 6 illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services ("AMS") 606 that transfer control between applications running on the mobile device 102. Also shown in FIG. 6 are a web browser application 608, a media player application 610, and JAVA applets 612. The web browser application 608 configures the mobile device 102 to operate as a web browser, allowing a user to enter information into forms and select links to retrieve and view web pages. The media player application 610 configures the mobile device 102 to retrieve and play audio or audiovisual media. The JAVA applets 612 configure the mobile device 102 to provide games, utilities, and other functionality. The diagnostic application 614 may correspond to the diagnostic application 120 provided by the system 100.

Figure 7:
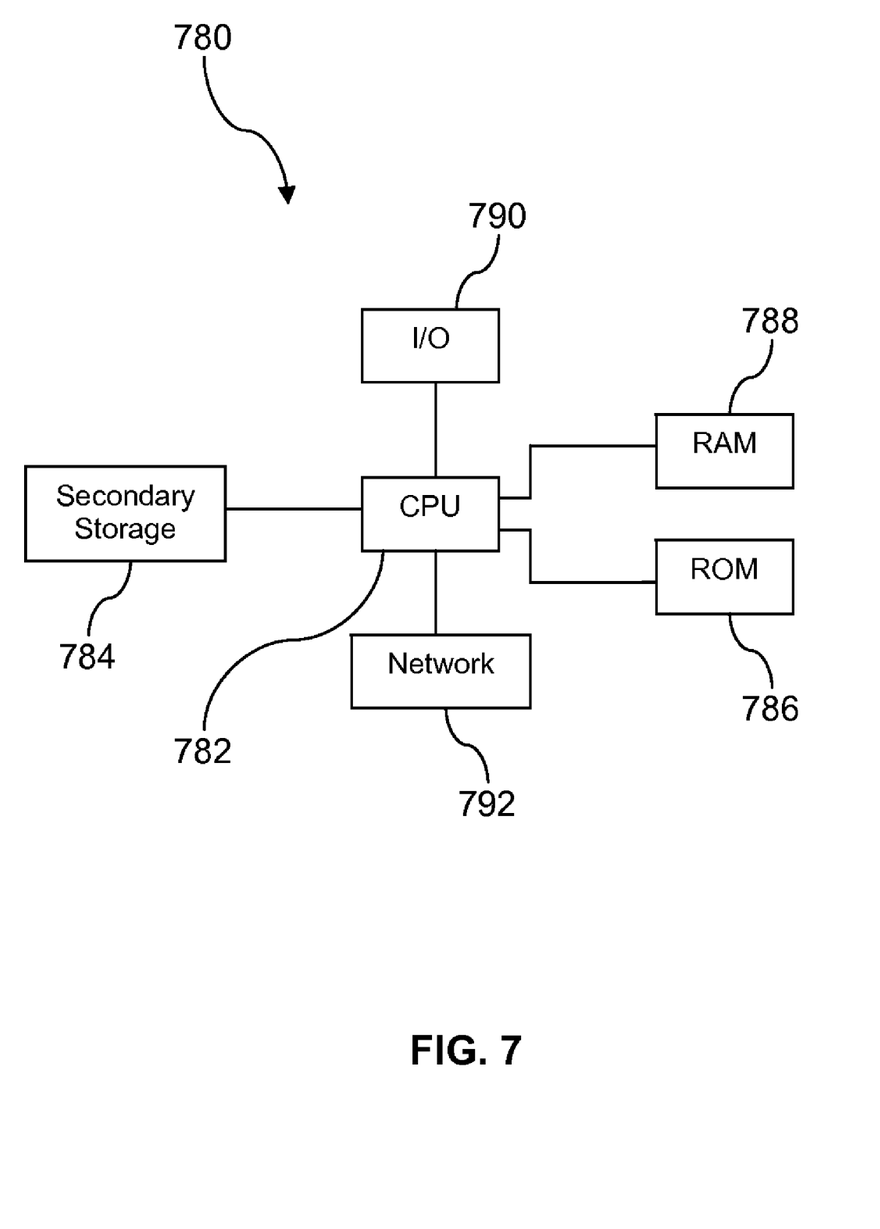
FIG. 7 illustrates an exemplary computer system suitable for implementing some aspects of the several embodiments of the disclosure.

FIG. 7 illustrates a computer system 780 suitable for implementing one or more embodiments disclosed herein. The computer system 780 includes a processor 782 (which may be referred to as a central processor unit or CPU) that is in communication with memory devices including secondary storage 784, read only memory (ROM) 786, random access memory (RAM) 788, input/output (I/O) devices 790, and network connectivity devices 792. The processor 782 may be implemented as one or more CPU chips.

It is understood that by programming and/or loading executable instructions onto the computer system 780, at least one of the CPU 782, the RAM 788, and the ROM 786 are changed, transforming the computer system 780 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 784 is typically comprised of one or more disk drives or tape drives and is used for non-volatile storage of data and as an over-flow data storage device if RAM 788 is not large enough to hold all working data. Secondary storage 784 may be used to store programs which are loaded into RAM 788 when such programs are selected for execution. The ROM 786 is used to store instructions and perhaps data which are read during program execution. ROM 786 is a non-volatile memory device which typically has a small memory capacity relative to the larger memory capacity of secondary storage 784. The RAM 788 is used to store volatile data and perhaps to store instructions. Access to both ROM 786 and RAM 788 is typically faster than to secondary storage 784. The secondary storage 784, the RAM 788, and/or the ROM 786 may be referred to in some contexts as computer readable storage media and/or non-transitory computer readable media.

I/O devices 790 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 792 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 792 may enable the processor 782 to communicate with the Internet or one or more intranets. With such a network connection, it is contemplated that the processor 782 might receive information from the network, or might output information to the network in the course of performing the above-described method steps. Such information, which is often represented as a sequence of instructions to be executed using processor 782, may be received from and outputted to the network, for example, in the form of a computer data signal embodied in a carrier wave.

Such information, which may include data or instructions to be executed using processor 782 for example, may be received from and outputted to the network, for example, in the form of a computer data baseband signal or signal embodied in a carrier wave. The baseband signal or signal embodied in the carrier wave generated by the network connectivity devices 792 may propagate in or on the surface of electrical conductors, in coaxial cables, in waveguides, in an optical conduit, for example an optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 782 executes instructions, codes, computer programs, scripts which it accesses from hard disk, floppy disk, optical disk (these various disk based systems may all be considered secondary storage 784), ROM 786, RAM 788, or the network connectivity devices 792. While only one processor 782 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 784, for example, hard drives, floppy disks, optical disks, and/or other device, the ROM 786, and/or the RAM 788 may be referred to in some contexts as non-transitory instructions and/or non-transitory information.

In an embodiment, the computer system 780 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 780 to provide the functionality of a number of servers that is not directly bound to the number of computers in the computer system 780. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 780, at least portions of the contents of the computer program product to the secondary storage 784, to the ROM 786, to the RAM 788, and/or to other non-volatile memory and volatile memory of the computer system 780. The processor 782 may process the executable instructions and/or data structures in part by directly accessing the computer program product, for example by reading from a CD-ROM disk inserted into a disk drive peripheral of the computer system 780. Alternatively, the processor 782 may process the executable instructions and/or data structures by remotely accessing the computer program product, for example by downloading the executable instructions and/or data structures from a remote server through the network connectivity devices 792. The computer program product may comprise instructions that promote the loading and/or copying of data, data structures, files, and/or executable instructions to the secondary storage 784, to the ROM 786, to the RAM 788, and/or to other non-volatile memory and volatile memory of the computer system 780.

In some contexts, a baseband signal and/or a signal embodied in a carrier wave may be referred to as a transitory signal. In some contexts, the secondary storage 784, the ROM 786, and the RAM 788 may be referred to as a non-transitory computer readable medium or a computer readable storage media. A dynamic RAM embodiment of the RAM 788, likewise, may be referred to as a non-transitory computer readable medium in that while the dynamic RAM receives electrical power and is operated in accordance with its design, for example during a period of time during which the computer 780 is turned on and operational, the dynamic RAM stores information that is written to it. Similarly, the processor 782 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A processor-implemented method, comprising:
    a portable electronic device receiving a first message that a key sequence has been entered into the portable electronic device, wherein the key sequence is associated with sending of an outgoing transmission, and wherein the outgoing transmission was not connected;
    the portable electronic device performing a first test comprising confirming at least one of the mobile directory number (MDN) and the network access identifier (NAI) of the portable electronic device, wherein upon completion of the first test when the mobile directory number (MDN) and the network access identifier (NAI) of the portable electronic device are found to be at their original factory settings, the portable electronic device is determined to be not provisioned for service, and wherein when the portable electronic device is determined to not be provisioned for service, the portable electronic device initiates contact with a telecommunications services provider to provision service;
    the portable electronic device performing a second test comprising requesting a first server to transmit a short message service (SMS) message to the portable electronic device;
    the portable electronic device performing a third test comprising transmitting a hypertext transport protocol (HTTP) message to a second server; and
    based on the results of at least one of the first test, the second test, and the third test, the portable electronic device at least one of displaying a first visual message and playing a second audible message advising at least one corrective action step.

2. The method of claim 1, wherein when the short message service (SMS) message is determined to have been received by the portable electronic device, the voice channel accessible by the portable electronic device is determined to be functional.

3. The method of claim 2, wherein the receipt of the short message service (SMS) message is not detectable by a user of the portable electronic device.

4. The method of claim 1, wherein the portable electronic device transmitting the hypertext transport protocol (HTTP) message to the second server promotes determining whether a data channel associated with the portable electronic device is functional.

5. The method of claim 1, wherein the portable electronic device determines that airplane mode is one of activated and deactivated prior to conducting the first test.

6. A processor-implemented method, comprising:
- a portable electronic device receiving a first message, the first message advising that a key sequence has been entered into the portable electronic device wherein the key sequence is associated with sending of an outgoing transmission and wherein the outgoing transmission was not connected;
- the portable electronic device sending a second message to a server wherein the second message is transmitted using the hypertext transport protocol (HTTP) and wherein the second message contains at least one of a version of a preferred roaming list (PRL) stored in the portable electronic device and a version of firmware executing on the portable electronic device;
- the server determining that at least one of the version of the preferred roaming list stored in the portable electronic device and the version of firmware is not current;
- the server sending a third message to the portable electronic device, the third message advising that at least one of the version of the preferred roaming list stored in the portable electronic device and the version of firmware is not current;
- the portable electronic device at least one of displaying a fourth visual message and playing a fifth audible message, the fourth message and fifth message advising that at least one of the preferred roaming list stored in the portable electronic device and the version of firmware is not current; and
- the portable electronic device providing at least one of a voice-activated selectable option and a visual selectable option providing the opportunity to download and install at least one of a current preferred roaming list and a current version of firmware.

7. The method of claim 6, wherein the exchange of messages between the portable electronic device and the server demonstrate that a data channel associated with the portable electronic device is functional.

8. The method of claim 6, wherein the current version of firmware is downloadable from at least one of a telecommunications services provider, from a producer of a software platform executing on the portable electronic device, and from an original equipment manufacturer (OEM) associated with the portable electronic device.

9. The method of claim 6, wherein the presence of at least one of a non-current and incorrect preferred roaming list (PRL) and a non-current firmware on the portable electronic device indicates that the portable electronic device is at least one of previously owned, lost, stolen, and associated with a deactivated subscription account.

10. The method of claim 9, wherein when the portable electronic device is determined to be associated with a deactivated subscription account, the portable electronic device initiates contact with a telecommunications services provider for investigation.

11. A portable electronic device, comprising:
- a processor;
- a memory;
- a radio transceiver; and
- an application, that, when executed on the portable electronic device,
  - receives a first message that a first key sequence has been entered into the portable electronic device, wherein the first key sequence is associated with the portable electronic device sending a first transmission, and wherein the first transmission was not connected,
  - determines that the portable electronic device is currently configured in an airplane mode, and
  - at least one of displays a visual second message and plays an audible third message advising that the portable electronic device is currently configured in the airplane mode, wherein upon receiving a seventh message that a second key sequence has been entered associated with the sending of a second transmission that was not connected, the application initiates additional testing to identify an at least one cause of a connection failure associated with the second transmission, and wherein the additional testing comprises at least one of determining that the portable electronic device is provisioned for service, determining that the portable electronic device is able to access a voice channel, determining that the portable electronic device is able to initiate a data session with a server using the hypertext transport protocol (HTTP), and determining that the at least one of the version of the preferred roaming list (PRL) stored in the portable electronic device and the version of the firmware executing on the portable electronic device is not current.

12. The system of claim 11, wherein airplane mode disables transmission by the radio transceiver.

13. The system of claim 11, wherein the application receives a fourth message that airplane mode has been deactivated and at least one of visually displays a fifth message and audibly plays a sixth message advising that airplane mode has been deactivated.

14. The system of claim 11, wherein the first key sequence entered is a keypad shortcut for use in contacting a customer care function of a telecommunications services provider.

15. The system of claim 11, where the first transmission is associated with one of placing a voice telephone call, with the sending of a short message service (SMS) message, with the sending of an electronic mail message, and with the initiation of a session using the hypertext transport protocol (HTTP).

16. The system of claim 11, wherein the third message instructs the user of the portable electronic device to view the display of the portable electronic device for instructions for deactivating airplane mode.

* * * * *